3,031,503
PREPARATION OF AMINODIBORANES
Jack W. Runkle, Steubenville, Ohio, assignor to Callery Chemical Company, Pittsburgh, Pa., a corporation of Pennsylvania
No Drawing. Filed July 22, 1959, Ser. No. 828,729
6 Claims. (Cl. 260—551)

This invention relates to aminodiboranes, and more particularly it relates to a method whereby aminodiboranes may be produced from tetraborane(10).

Aminodiboranes are compounds of boron and nitrogen in which an amino group is substituted for one of the hydrogens of diborane. They correspond to the empirical formula $R_2NB_2H_5$, where R is an alkyl radical or hydrogen or both. These compounds have been known for some time and have been found to be useful as hydrocarbon fuel additives for such purposes as preventing deposition on piston and cylinder walls, thereby reducing the increased octane requirement of internal combustion engines in which ordinary leaded gasolines are used.

It is an object of this invention to provide a new method for the preparation of aminodiboranes which is simple and easily practiced and which is applicable to the preparation of a wide variety of aminodiboranes. Another object is to provide a method whereby aminodiboranes are produced in high yield. Other objects will become apparent from the following specification and claims.

The basis for this invention lies largely in my discovery that under certain conditions amines and tetraborane(10) react to form aminodiboranes. I have found that this reaction takes place when an alkyl amine having at least one hydrogen atom attached to the nitrogen is reacted with tetraborane(10) at elevated temperatures of at least about 100° C. The reaction takes place according to Equation 1 below:

(1) $\quad 2R_2NH + B_4H_{10} \rightarrow 2R_2NB_2H_5 + H_2$ where R is an alkyl radical or hydrogen.

The preferred temperature at which the above reaction is carried out depends upon the particular amine used. Primary amines tend to react at lower temperatures than do secondary amines and lower alkyl amines tend to react at lower temperatures than do higher amines. In general, however, temperatures of about 150° C. to about 180° C. are preferable. The upper temperature limit is governed by the temperature at which the reactants or products decompose and thus is also dependent upon the particular reaction system. I have found that temperatures of above about 250° C. result in some decomposition of the product when a lower alkyl amine is used; decomposition can be avoided even at higher temperatures when higher amines are employed.

The alkyl amines which are useful in the practice of this invention include any primary and secondary alkyl amine, such as methylamine, dimethylamine, ethylamine, diethylamine, propylamine, dipropylamine, butylamine, hexylamine and octylamine.

In one test illustrating the method and practice of this invention, a 100 ml. Pyrex reactor was degassed and charged with 1.16 millimols of tetraborane(10) and 2.40 millimols of dimethylamine. The reactor was then sealed and the reactants were warmed to 150° C. and maintained at that temperature for two hours. The reactor was then opened and the products of the reaction were removed and analyzed. It was found that 2.21 millimols of dimethylaminodiborane, $(CH_3)_2NB_2H_5$, were formed along with 1.48 millimols of hydrogen. Based on Equation 1 the yield of dimethylaminodiborane obtained was 95%.

In studies in which the mechanism of the above described reaction was sought to be elucidated, it was found that the amine-triborane(7) adducts which are formed from the reaction of tetraborane(10) with amines at lower temperatures split out $BH_3$ at elevated temperatures to form aminodiboranes in accordance with Equation 2 below:

(2) $\quad R_2NHB_3H_7 \rightarrow R_2NB_2H_5 + BH_3$ where R is an alkyl group or hydrogen.

The temperature at which the reaction shown in Equation 2 takes place also depends upon the particular amine adduct employed. However, it has been found that in general the temperature corresponds to that necessary for the reaction shown in Equation 1, i.e. at least about 100° C. It is believed, therefore, that Equation 2 represents the second step of the process of Equation 1, with the first step being the formation of the amine-triborane(7) adduct from tetraborane(10) and the amine.

The reaction shown in Equation 2 was demonstrated by tests in which a 100 ml. glass reactor was charged with 3.87 millimols of tetrahydropyran and 3.87 millimols of tetraborane(10). These compounds were reacted at 0° C. for one hour and the reaction mixture was then warmed to room temperature for one hour. 2.03 millimols of diborane formed and were removed from the reactor. Tetrahydropyran-triborane(7), $C_5H_{10}O:B_3H_7$, remained in the reactor and was reacted with 3.87 millimols of dimethylamine at room temperature; 3.72 millimols of tetrahydropyran were recovered from this reaction. The reactor, now containing dimethylamine-triborane(7), $(CH_3)_2NH:B_3H_7$, was sealed and heated to 125° C. for five hours. Upon opening the reactor, 3.68 millimols of dimethylaminodiborane were obtained, a 95% overall yield (based on Equation 2 and assuming that the first step resulted in a 100% yield of dimethylamine-triborane(7)).

The amine-triborane(7) adducts which may be used in the practice of the process shown in Equation 2 may be represented by the formula $X:B_3H_7$, where X is an alkyl amine which has at least one hydrogen atom attached to the nitrogen. Examples of such amine-triborane(7) compounds include methylamine-triborane(7), dimethylamine-triborane(7), ethylamine-triborane(7), diethylamine-triborane(7), propylamine-triborane(7), dipropylamine-triborane(7), butylamine-triborane(7), amylamine-triborane(7), and hexylamine-triborane(7).

As the above described tests illustrate, aminodiboranes are obtained by the practice of my invention in very high yield. Moreover, the aminodiboranes are obtained along with by-products of high volatility so that the separation is relatively easy. The process is thus simple and efficient.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. A method for the preparation of an aminodiborane which comprises reacting tetraborane(10) with an alkyl amine having not more than 8 carbon atoms in each alkyl group and having at least one hydrogen atom attached to the nitrogen at a temperature above about 100° C. and below the decomposition temperature of the reactants and products and recovering the aminodiborane thus formed.

2. A method in accordance with claim 1 in which the amine is selected from the group consisting of primary and secondary methyl, ethyl and propyl amines.

3. A method for the preparation of dimethylaminodiborane which comprises reacting tetraborane(10) with dimethylamine at a temperature between about 100° C. and about 250° C. and recovering the dimethylaminodiborane thus formed.

4. A method for the preparation of an aminodiborane which comprises heating an amine-triborane(7) adduct of the formula $X:B_3H_7$, where X is an alkyl amine having not more than 8 carbon atoms in each alkyl group and having at least one hydrogen atom attached to the nitrogen, to a temperature above about 100° C. and below the decomposition temperature of the reactants and products and recovering the aminodiborane thus formed.

5. A method in accordance with claim 4 in which the amine is selected from the group consisting of primary and secondary methyl, ethyl, and propyl amines.

6. A method for the preparation of dimethylaminodiborane which comprises heating dimethylamine-triborane(7) to a temperature between about 100° C. and about 250° C. and recovering the dimethylaminodiborane thus formed.

References Cited in the file of this patent

Burg et al.: J. American Chem. Soc., vol. 75, pages 228–9 (1953).

Schechter et al.: "Boron Hydrides and Related Compounds," pages 19, 28, 95–96 (declassified December 1953).